United States Patent
Fujii et al.

(10) Patent No.: US 9,643,878 B2
(45) Date of Patent: May 9, 2017

(54) SHEET GLASS MANUFACTURING METHOD AND MANUFACTURING DEVICE

(71) Applicant: Nippon Electric Glass Co., Ltd., Shiga (JP)

(72) Inventors: Takahide Fujii, Shiga (JP); Naotoshi Inayama, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 14/441,934

(22) PCT Filed: Oct. 29, 2013

(86) PCT No.: PCT/JP2013/079208
§ 371 (c)(1),
(2) Date: May 11, 2015

(87) PCT Pub. No.: WO2014/077117
PCT Pub. Date: May 22, 2014

(65) Prior Publication Data
US 2015/0299019 A1 Oct. 22, 2015

(30) Foreign Application Priority Data

Nov. 13, 2012 (JP) ................................. 2012-249313

(51) Int. Cl.
*C03B 33/08* (2006.01)
*C03B 17/06* (2006.01)
(Continued)

(52) U.S. Cl.
CPC .......... *C03B 33/082* (2013.01); *C03B 23/023* (2013.01); *C03B 33/0235* (2013.01);
(Continued)

(58) Field of Classification Search
CPC ......... C03B 33/08; C03B 33/00–33/14; C03B 37/005
(Continued)

(56) References Cited

U.S. PATENT DOCUMENTS 2,621,444 A * 12/1952 Schuller .................. C03B 37/03
19/0.56
3,278,284 A * 10/1966 Van Dolah ................ C03C 4/00
241/183
(Continued)

FOREIGN PATENT DOCUMENTS

CN 101542264 9/2009
CN 101980817 2/2011
(Continued)

OTHER PUBLICATIONS

International Preliminary Report on Patentability and Written Opinion of the International Searching Authority issued May 19, 2015 in International (PCT) Application No. PCT/JP2013/079208.
(Continued)

*Primary Examiner* — Jason L Lazorcik
(74) *Attorney, Agent, or Firm* — Wenderoth, Lind & Ponack, L.L.P.

(57) ABSTRACT

Provided is a manufacturing method for a glass sheet, including: fusing a glass ribbon (G) by irradiating the glass ribbon (G) with a laser (L) along a preset cutting line (X), which is a boundary between a product portion (G1) to be used as a product and a non-product portion (G2) to be discarded, and jetting an assist gas (A) onto molten glass (M) generated by melting the glass ribbon (G) through heating with the laser (L) so as to remove the molten glass (M) by scattering the molten glass (M); and breaking the non-product portion (G2) so as to discard the non-product portion (G2), the assist gas (A) being jetted from the product portion (G1) side with respect to the preset cutting line (X),
(Continued)

to thereby cause scattered pieces of the molten glass (M) to adhere to the non-product portion (G2) as pieces of dross (D).

8 Claims, 7 Drawing Sheets (51) Int. Cl.
    *C03B 23/023*    (2006.01)
    *C03B 33/023*    (2006.01)
    *C03B 33/09*     (2006.01)
    *C03B 35/16*     (2006.01)

(52) U.S. Cl.
    CPC .......... *C03B 33/091* (2013.01); *C03B 35/167* (2013.01); *C03B 17/064* (2013.01)

(58) Field of Classification Search
    USPC ........................................ 65/21.1, 21.5, 25.4
    See application file for complete search history.

(56) References Cited

U.S. PATENT DOCUMENTS

| | | | | |
|---|---|---|---|---|
| 3,589,351 | A * | 6/1971 | Shoupp ................ | B28D 1/221 125/1 |
| 4,467,168 | A * | 8/1984 | Morgan ................ | C03B 33/082 219/121.67 |
| 4,489,870 | A * | 12/1984 | Prange ................ | C03B 33/033 225/2 |
| 5,359,176 | A * | 10/1994 | Balliet, Jr. ........ | B23K 26/1476 219/121.67 |
| 5,770,833 | A * | 6/1998 | Kanaoka ............ | B23K 26/1476 219/121.67 |
| 6,204,475 | B1 * | 3/2001 | Nakata ................ | B23K 26/147 219/121.84 |
| 6,502,423 | B1 * | 1/2003 | Ostendarp ............ | C03B 17/06 65/100 |
| 6,710,294 | B2 * | 3/2004 | Lawson ............... | B23K 26/147 219/121.69 |
| 9,422,184 | B2 * | 8/2016 | Fujii .................. | C03B 33/0222 |
| 2001/0029365 | A1 * | 10/2001 | Nagahori ........... | B23K 26/1494 606/13 |
| 2007/0228630 | A1 * | 10/2007 | Grundmuller ........ | B23K 26/10 269/71 |
| 2009/0242525 | A1 | 10/2009 | O'Brien et al. | |
| 2010/0102042 | A1 * | 4/2010 | Garner ................ | C03B 33/0215 219/121.68 |
| 2010/0107848 | A1 * | 5/2010 | Joseph, II ............ | C03B 21/04 83/862 |
| 2011/0114610 | A1 * | 5/2011 | Szelagowski ........ | B23K 26/142 219/121.71 |
| 2011/0197634 | A1 * | 8/2011 | Eta .......................... | C03B 17/06 65/97 |
| 2011/0217521 | A1 * | 9/2011 | Teranishi .................. | B32B 3/02 428/189 |
| 2012/0017642 | A1 * | 1/2012 | Teranishi ............. | B28D 5/0011 65/105 |
| 2012/0024928 | A1 * | 2/2012 | Matsumoto ............ | B28D 1/221 225/2 |
| 2012/0103953 | A1 | 5/2012 | O'Brien et al. | |
| 2012/0125967 | A1 * | 5/2012 | Furuta ................. | C03B 33/0235 225/3 |
| 2012/0131962 | A1 * | 5/2012 | Mitsugi ............... | C03B 33/0235 65/112 |
| 2012/0247154 | A1 * | 10/2012 | Abramov ............ | C03B 33/0235 65/54 |
| 2013/0091897 | A1 * | 4/2013 | Fujii .................... | C03B 33/0222 65/112 |
| 2013/0122264 | A1 * | 5/2013 | Fujii .................... | C03B 33/0222 428/192 |
| 2015/0218034 | A1 * | 8/2015 | Bigelow .................. | B26D 7/18 156/271 |
| 2015/0307386 | A1 * | 10/2015 | Inayama ................ | B23K 26/14 65/112 |

FOREIGN PATENT DOCUMENTS

| | | |
|---|---|---|
| JP | 8-141764 | 6/1996 |
| JP | 10-225787 | 8/1998 |
| JP | 2011-116611 | 6/2011 |
| JP | 2011-144092 | 7/2011 |
| JP | 2011-201765 | 10/2011 |
| JP | 2011-219338 | 11/2011 |
| JP | 2012-96936 | 5/2012 |
| TW | 593176 | 6/2004 |
| WO | 2011/037167 | 3/2011 |

OTHER PUBLICATIONS

Office Action issued Jul. 13, 2016 in corresponding Chinese Application No. 201380047872.7, with partial English translation.
International Search Report issued Jan. 21, 2014 in International (PCT) Application No. PCT/JP2013/079208.
Office Action issued Aug. 17, 2016 in corresponding Taiwanese Application No. 102139208, with English translation of Search Report.
Taiwanese Office Action issued Feb. 3, 2017 in counterpart Taiwanese Application No. 102139208 with partial English translation.

* cited by examiner

SHEET GLASS MANUFACTURING METHOD AND MANUFACTURING DEVICE

TECHNICAL FIELD

The present invention relates to a manufacturing method for a glass sheet and a manufacturing apparatus for a glass sheet, which are configured to fuse a glass sheet into a product portion to be used as a product and a non-product portion to be discarded, and then breaking the non-product portion into small pieces so as to discard the non-product portion.

BACKGROUND ART

As is well known, when a band-like glass ribbon is formed by a down-draw method or the like, selvage portions thicker than a central portion of the glass ribbon are formed at both ends thereof in a width direction. Thus, when the glass ribbon is rolled into a roll shape so as to manufacture a glass roll, the selvage portions are usually cut in order to prevent a diameter thereof from being improperly increased because of the thickness of each of the selvage portions.

For example, a method disclosed in Patent Literature 1 is publicly known as a method of cutting the selvage portions. The method disclosed in Patent Literature 1 utilizes a so-called laser cleaving method. A laser is radiated along a boundary between the central portion and each of the selvage portions of the glass ribbon in the width direction, to thereby form a heated portion in the glass ribbon. Then, the heated portion is cooled with refrigerant following the laser. Then, due to a thermal stress generated at this time, initial cracks formed at end portions of the glass ribbon in a longitudinal direction are propagated, to thereby cut the selvage portions.

CITATION LIST

Patent Literature 1: JP 2011-201765 A

SUMMARY OF INVENTION

Technical Problem

Unlike the central portion, the selvage portions cut as described above are to be discarded without being used as glass sheet products. In this case, it is necessary to further break the selvage portions into small pieces each having a size suitable for discarding. However, when the laser cleaving method is used to cut the selvage portions, not only the mechanical strength of the central portion to be used as a product, but also the mechanical strength of each of the selvage portions to be broken into small pieces is increased due to the characteristics of the laser cleaving method.

Thus, when the selvage portions with the increased strength are broken into small pieces so as to be discarded, it has been necessary to, for example, separately carry out a step of forming scribe lines in the selvage portions and a step of snapping the selvage portions. As a result, time and efforts are inevitably required to carry out those steps, thereby causing a problem in that it is difficult to discard the selvage portions efficiently.

Further, such a problem occurs not only in the case of discarding the selvage portions. The problem similarly occurs, for example, when portions that are not to be used as products are discarded in the case of cutting the glass ribbon so as to change a width dimension thereof after selvage portions are cut, or in the case of cutting out a glass sheet product from the glass ribbon.

In view of the above-mentioned circumstances, it is a technical object of the present invention to efficiently break portions to be discarded without being used as glass sheet products into small pieces when glass sheet products are manufactured.

Solution to Problem

The feature of the present invention, which is devised so as to achieve the above-mentioned object, resides in a manufacturing method for a glass sheet, comprising: fusing a glass sheet by irradiating the glass sheet with a laser along a preset cutting line, which is a boundary between a product portion to be used as a product and a non-product portion to be discarded, and jetting an assist gas onto molten glass generated by melting the glass sheet through heating with the laser so as to remove the molten glass by scattering the molten glass; and breaking the non-product portion so as to discard the non-product portion, the assist gas being jetted from the product portion side with respect to the preset cutting line, to thereby cause scattered pieces of the molten glass to adhere to the non-product portion as pieces of dross.

With the above-mentioned method, the pieces of the molten glass scattered with the pressure of the assist gas jetted from the product portion side can be caused to adhere to the non-product portion actively as the pieces of dross. Further, a large number of microcracks are formed in the non-product portion having the pieces of dross adhering thereto due to the thermal shock and the physical shock caused by the adhesion of the pieces of dross. Thus, the mechanical strength (fracture strength) of the non-product portion can be significantly reduced. As a result, the non-product portion after the fusing is brought into a state of being breakable easily by a stress applied to the non-product portion. Thus, the non-product portion can be broken into small pieces efficiently.

In the above-mentioned method, it is preferred that the assist gas be jetted from one of a front surface side and a back surface side of the glass sheet, onto which the laser is caused to enter.

Glass is more likely to melt on one of the front surface side and the back surface side of the glass sheet, onto which the laser is caused to enter. Thus, when the assist gas is jetted onto the glass sheet from the surface side onto which the laser is caused to enter, the generated molten glass can be removed efficiently. As a result, the glass sheet can be fused smoothly, and the scattered pieces of the molten glass easily adhere to the non-product portion as the pieces of dross.

In the above-mentioned method, the product portion may have a thickness of 500 μm or less.

In general, when the product portion has a thickness of 500 μm or less, the non-product portion adjacent to the product portion is also brought into a thin state at a thickness of about 500 μm or less. Thus, there occurs such a phenomenon that, when a stress to break the non-product portion is applied thereto, the non-product portion may be deformed and the applied stress may be weakened due to the small thickness. Consequently, in order to break the non-product portion, it is necessary to take measures to apply a more significant stress to the non-product portion. However, according to the present invention, even when the thickness is small, the mechanical strength of the non-product portion can be easily reduced by causing the dross to adhere thereto. Thus, the non-product portion can be broken without taking such measures as described above. In view of the foregoing, the effects of the present invention can be provided more suitably in the case where the thickness is small. Note that, the thickness of the product portion is more preferably 300 μm or less, even more preferably 200 μm or less, most preferably 100 μm or less.

In the above-mentioned method, it is preferred that the glass sheet be a band-like glass ribbon, and that the preset cutting line extend in parallel to a longitudinal direction of the band-like glass ribbon.

With this, the glass ribbon can be continuously fused along the longitudinal direction thereof and the scattered pieces of the molten glass can be caused to adhere as the pieces of dross over the entire lengthwise region of the non-product portion of the glass ribbon. Thus, the entire region of the non-product portion in the longitudinal direction after the fusing is in a state in which the mechanical strength thereof is significantly reduced. Therefore, when a stress is applied to the non-product portion after the fusing at intervals corresponding to the length of small pieces to be formed, it is possible to break the non-product portion into pieces having a desired length suitable for discarding.

It is preferred that the above-mentioned method further comprise forming the band-like glass ribbon by a down-draw method, and that the non-product portion be a selvage portion formed at each of both ends of the band-like glass ribbon in a width direction thereof.

With this, the selvage portion can be continuously fused off the glass ribbon formed by the down-draw method. Thus, the selvage portion having a mechanical strength significantly reduced after the fusing due to the adhesion of the dross can be broken into small pieces efficiently.

It is preferred that the above-mentioned method further comprise feeding the band-like glass ribbon from a glass roll formed by rolling the band-like glass ribbon.

With this, the glass ribbon sequentially unrolled from the glass roll can be fused continuously, thereby being capable of enhancing the manufacturing efficiency significantly.

It is preferred that the above-mentioned method further comprise curving one of a front surface and a back surface of the non-product portion after the fusing, onto which the laser is caused to enter, to thereby exhibit a convex curved surface in the longitudinal direction.

When the dross adheres to the non-product portion, a larger amount of the dross adheres to one of the front surface and the back surface of the non-product portion, onto which the laser is caused to enter. Thus, when the non-product portion after the fusing is curved so that the surface exhibits a convex curved surface in the longitudinal direction, microcracks formed in the portion having the pieces of dross adhering thereto can be propagated from this surface side to an opposite surface side due to a tensile stress, thereby being capable of breaking the non-product portion into small pieces.

It is preferred that the above-mentioned method further comprise preparing a passage through which the non-product portion after the fusing is caused to pass, the passage having a curved portion, which is curved into a round shape.

With this, the non-product portion after the fusing only needs to pass through the curved portion of the passage, and thus the surface of the non-product portion onto which the laser is caused to enter is curved so as to exhibit a convex curved surface in the longitudinal direction. Thus, the non-product portion passing through the passage can be broken continuously and automatically, and hence the non-product portion can be broken into small pieces more efficiently.

It is preferred that the above-mentioned method further comprise separating a cutting end portion formed in the product portion after the fusing and a cutting end portion formed in the non-product portion after the fusing away from each other along a thickness direction.

With this, it is possible to suitably prevent the cutting end portion formed in the product portion after the fusing and the cutting end portion formed in the non-product portion after the fusing from striking or sliding against each other due to, for example, warping deformation caused during fusing or vibration caused during conveyance.

Further, the feature of the present invention, which is devised so as to achieve the above-mentioned object, resides in a manufacturing apparatus for a glass sheet, comprising: laser irradiation means for irradiating a glass sheet with a laser along a preset cutting line, which is a boundary between a product portion to be used as a product and a non-product portion to be discarded; assist gas jetting means for jetting an assist gas onto molten glass generated by melting the glass sheet through heating with the laser; and breaking means for breaking the non-product portion into small pieces, the assist gas jetting means being arranged on the product portion side with respect to the preset cutting line, pieces of the molten glass scattered by jetting the assist gas being caused to adhere to the non-product portion as pieces of dross.

With the above-mentioned structure, the same actions and effects as those already described for the manufacturing method for a glass sheet can be provided.

In the above-mentioned structure, it is preferred that the breaking means have a passage through which the non-product portion having the pieces of dross adhering thereto is caused to pass, and that the passage have a curved portion for curving the non-product portion into a round shape so that a surface of the non-product portion having the pieces of dross adhering thereto exhibits a convex curved surface along a passing direction.

With this, the same actions and effects as those already described for the manufacturing method for a glass sheet can be provided.

Advantageous Effects of Invention

As described above, according to the present invention, when the glass sheet is manufactured, the dross is caused to adhere to the portion to be discarded without being used as a product. Therefore, the mechanical strength thereof can be significantly reduced, thereby being capable of breaking the portion into small pieces efficiently.

DESCRIPTION OF EMBODIMENTS

Embodiments of the present invention are described below with reference to the attached drawings. Note that, in the following descriptions, a "front surface" of a glass ribbon or a non-product portion refers to, of the front and back surfaces of the glass ribbon or the non-product portion, a surface located on a side onto which a laser described later is caused to enter, and a "back surface" thereof refers to a surface located on an opposite side thereto.

First, a first embodiment of the present invention is described. Note that, the first embodiment is described by taking as an example a case where a band-like glass ribbon formed so as to have a thickness of 500 μm or less is fused into a product portion to be used as a product and non-product portions to be discarded by roll-to-roll (mode in which the glass ribbon is unrolled from a glass roll so as to be processed, and then the processed glass ribbon is again rolled as the glass roll) to adjust a width dimension of the product portion, and the non-product portions after fusing are broken into small pieces so as to be discarded.

Figure 1:
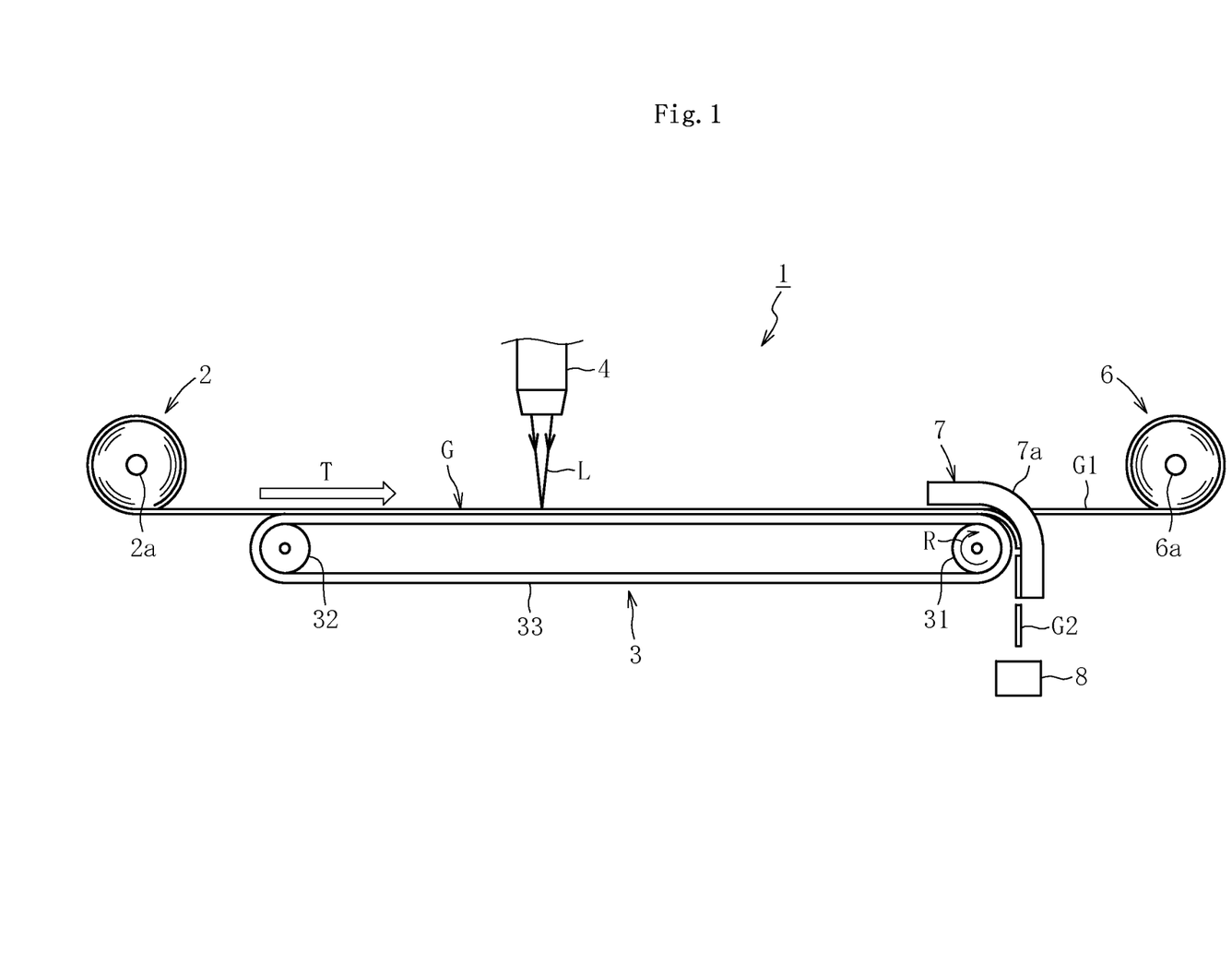
FIG. 1 is a side view illustrating a manufacturing apparatus for a glass sheet according to a first embodiment of the present invention.
Figure 2:
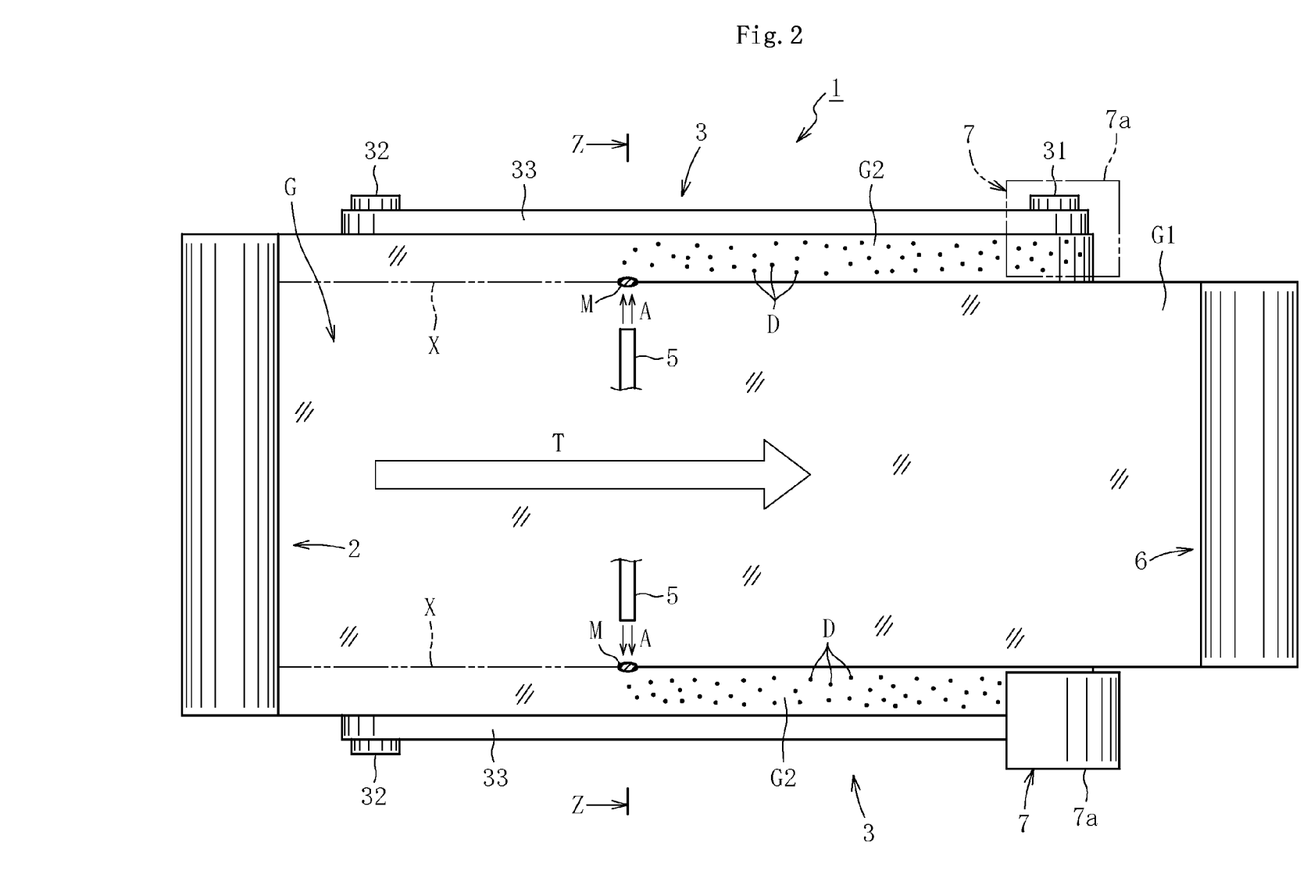
FIG. 2 is a plan view illustrating the manufacturing apparatus for a glass sheet according to the first embodiment of the present invention.
Figure 3:
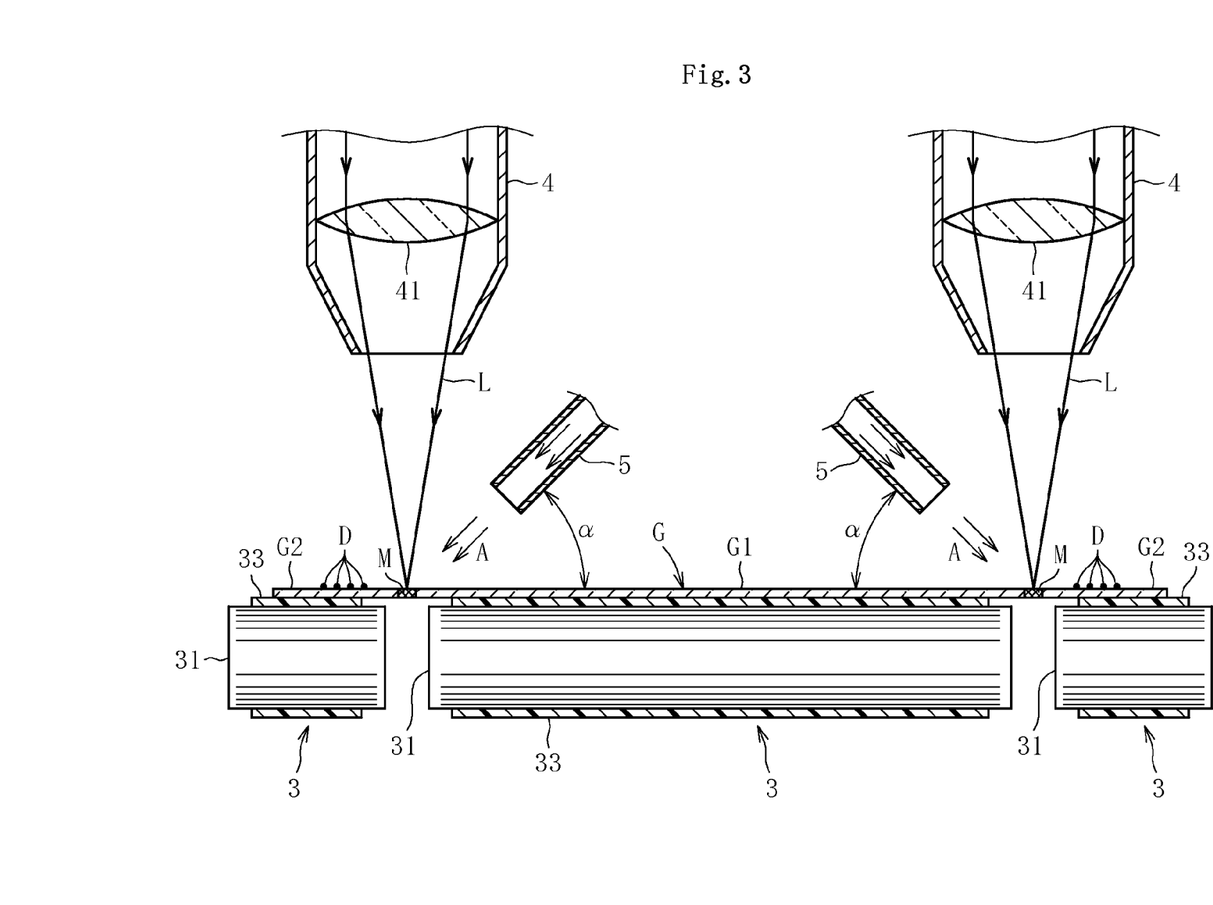
FIG. 3 is a cross-sectional front view illustrating the manufacturing apparatus for a glass sheet according to the first embodiment of the present invention.

FIG. 1 is a side view illustrating a manufacturing apparatus for a glass sheet according to the first embodiment of the present invention. FIG. 2 is a plan view thereof. FIG. 3 is a cross-sectional front view taken along the line Z-Z in FIG. 2. As illustrated in FIGS. 1 to 3, a manufacturing apparatus 1 for a glass sheet comprises, as main components, a first glass roll 2 obtained by rolling a band-like glass ribbon G, belt conveyors 3 for conveying the glass ribbon G fed from the first glass roll 2, laser irradiators 4 serving as laser irradiation means for irradiating the glass ribbon G with a laser L along two preset cutting lines X extending in parallel to a longitudinal direction of the glass ribbon G during conveyance, assist gas jetting nozzles 5 installed on the front surface side serving as assist gas jetting means for jetting an assist gas A so as to scatter molten glass M generated by melting the glass ribbon G through heating with the laser L, a second glass roll 6 to be formed by rolling a product portion G1 after fusing, guide members 7 serving as breaking means for guiding non-product portions G2 after fusing and breaking the non-product portions G2 into small pieces, and a cullet box 8 for receiving the non-product portions G2 broken into small pieces so as to be discarded. Note that, a thickness of the glass ribbon G is set to 500 μm or less, but more preferably 300 μm or less, still more preferably 200 μm or less, most preferably 100 μm or less.

The first glass roll 2 is arranged on an upstream side of the belt conveyors 3, and the glass ribbon G is rolled into a roll shape around a roll core 2a thereof. Further, the glass ribbon G is unrolled sequentially so as to be fed onto the belt conveyors 3.

Three belt conveyors 3 are installed in parallel to the two preset cutting lines X extending in the longitudinal direction of the glass ribbon G, and are arranged so that the two adjacent belt conveyors 3 sandwich the preset cutting line X. Each of the belt conveyors 3 comprises a driving roller 31 to be rotationally driven in an R direction illustrated in FIG. 1, a driven roller 32, and a belt 33 looped around both the rollers 31 and 32. The belt conveyors 3 are configured to operate in synchronization with each other. Further, the belt conveyor 3 arranged at the center conveys the product portion G, which is positioned at the center of the glass ribbon G in a width direction, in a T direction illustrated in FIGS. 1 and 2. The two belt conveyors 3 arranged at both ends convey the non-product portions G2, which are positioned at both the ends, in the T direction.

The laser irradiators 4 are installed in pairs in a state of being fixed on stationary points so that the two preset cutting lines X extending in the longitudinal direction of the glass ribbon G conveyed by the belt conveyors 3 each pass through a region vertically below the laser irradiator 4. Each of the laser irradiators 4 has a lens 41 for converging the laser L oscillated from a laser oscillator (not shown), and is configured to irradiate the glass ribbon G along the preset cutting line X with the laser L converged by the lens 41, to thereby heat and melt glass positioned at the irradiation portion thereof.

The assist gas jetting nozzles 5 are formed into a cylindrical shape, and are installed in pairs in a state of being fixed on stationary points on the product portion G1 side with respect to the preset cutting lines X extending in the longitudinal direction of the glass ribbon G so as to have a posture inclined by an angle α with respect to the front surface of the glass ribbon G. A jetting port for jetting the assist gas A opens toward the irradiation portion of the laser L, and the assist gas A having passed through the inside of the assist gas jetting nozzle 5 causes the molten glass M generated by melting the glass ribbon G through heating with the laser L to scatter toward the non-product portion G2 side with the pressure thereof, to thereby remove the molten glass M. Thus, the glass ribbon G is fused into the product portion G1 and the non-product portions G2, and the scattered molten glass M is caused to adhere to the non-product portions G2 as dross D. Herein, the inclination angle α of the assist gas jetting nozzle 5 with respect to the front surface of the glass ribbon G is preferably 0 to 45°, and the jetting pressure of the assist gas A is preferably 0.01 to 1.0 MPa. Note that, the jetting pressure of the assist gas A refers to a static pressure inside a pipe through which the assist gas A is supplied in a state in which the assist gas A is supplied.

The second glass roll 6 is arranged on a downstream side of the belt conveyor 3, and is configured to roll the product portion G1, which is obtained by fusing the glass ribbon G, into a roll shape around a roll core 6a thereof with the front surface thereof oriented inward.

The guide members 7 are positioned at downstream ends of the belt conveyors 3, and are installed so as to cover parts of the belts 33. The guide members 7 each have a curved portion 7a that is a roundly curved part of the guide member 7. The curved portion 7a is formed so as to have a uniform round shape having a curvature center corresponding to a rotation axis of the driving roller 31 in the belt conveyor 3. Further, a given clearance is secured between the curved portion 7a and the belt 33 so that the guide member 7 form a passage through which the non-product portion G2 obtained by fusing the glass ribbon G is caused to pass. The non-product portion G2 passing through the passage is curved so that the front surface thereof exhibits a convex curved surface, and thus the non-product portion G2 is broken into small pieces by a tensile stress applied thereto at this time. Note that, the curved shape of the curved portion 7a may be a shape having a curvature that gradually increases toward a forward side of the non-product portion G2 in its advancing direction. Examples of the shape include, for example, a shape curved along a clothoid curve.

The cullet box 8 is installed at a position vertically below a downstream end of each of the belt conveyors 3, and is configured to receive the small pieces of the non-product portions G2 therein.

Now, an action of a manufacturing method for a glass sheet using the above-mentioned manufacturing apparatus 1 for a glass sheet is described with reference to the attached drawings.

While the glass ribbon G fed from the first glass roll 2 is conveyed by the belt conveyors 3, the glass ribbon G is irradiated with the laser L and the assist gas A is jetted onto the molten glass M generated by melting the glass ribbon G through heating with the laser L. With this, the molten glass M is scattered and removed due to the pressure of the assist gas A, to thereby adjust the dimension of the product portion G1 in the width direction.

Figure 4:
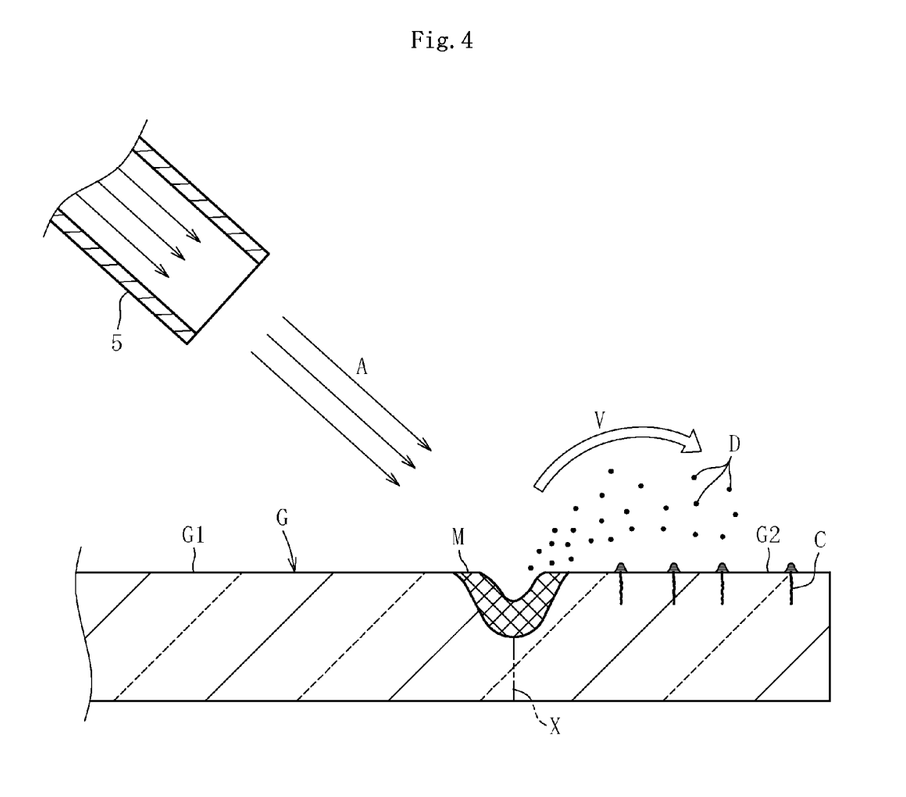
FIG. 4 is a cross-sectional front view illustrating an action of a manufacturing method for a glass sheet according to the first embodiment of the present invention.

On this occasion, as illustrated in FIG. 4, the assist gas A is jetted from the product portion G1 side with respect to the preset cutting lines X, thereby being capable of causing pieces of the molten glass M scattered in a V direction to adhere to the non-product portion G2 actively as pieces of the dross D. The pieces of the dross D adhere over the entire region in the longitudinal direction of the non-product portion G2 of the glass ribbon G.

Note that, of the front and back surfaces of the glass ribbon G, glass is more likely to melt on the front surface side onto which the laser L is caused to enter. Thus, when the assist gas A is jetted from the front surface side, the generated molten glass M can be removed efficiently. As a result, the glass ribbon G can be fused smoothly, and pieces of the scattered molten glass M easily adhere to the non-product portion G2 as pieces of the dross D.

Figure 5:
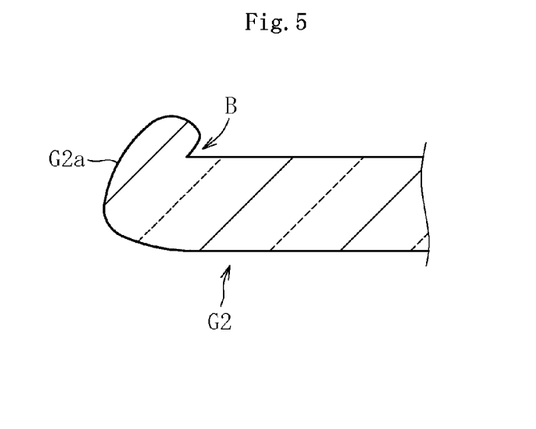
FIG. 5 is a side view illustrating an end portion of a fused non-product portion.

Further, when the assist gas A is jetted as described above, a bent portion B is liable to be formed at an end portion G2a of the non-product portion G2 after fusing as illustrated in FIG. 5. When this bent portion B is formed, as described below, the stress applied to the bent portion B is increased (stress concentration occurs) at the time of curving the non-product portion G2, and hence the effect that the non-product portion G2 is more easily broken into small pieces is provided.

Further, a large number of microcracks C are formed in the non-product portion G2 having the pieces of the dross D adhering thereto due to the thermal shock and the physical shock caused by the adhesion of the pieces of the dross D. Thus, the mechanical strength (fracture strength) of the non-product portion G2 after fusing can be significantly reduced. As a result, the non-product portion G2 can be brought into a state of being breakable easily by a stress applied to the non-product portion G2.

Figure 6:
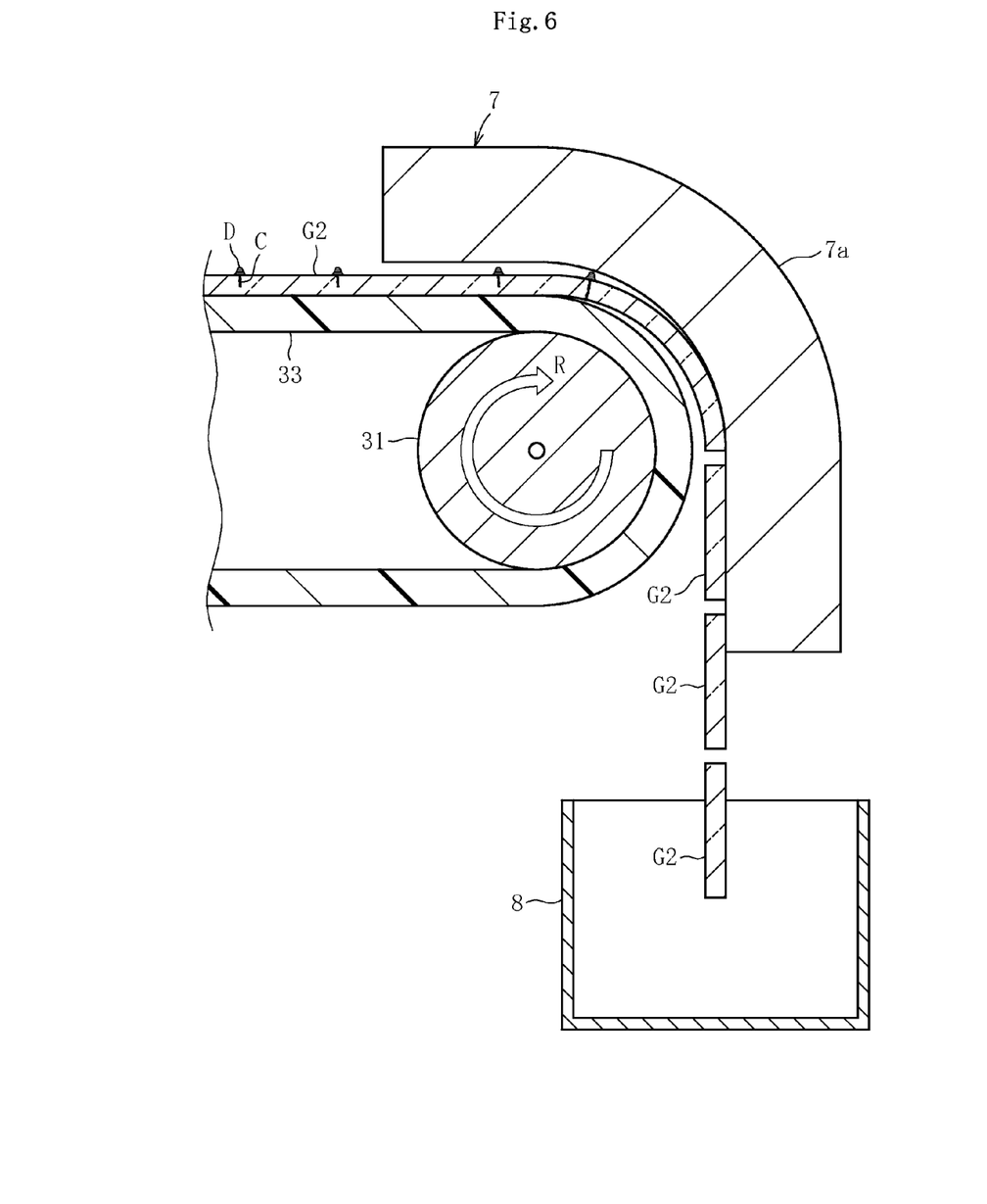
FIG. 6 is a cross-sectional side view illustrating an action of the manufacturing method for a glass sheet according to the first embodiment of the present invention.

After the fusing, the non-product portion G2 having a mechanical strength significantly reduced is continuously conveyed into the passage formed by the belt 33 and the guide member 7. Then, when the non-product portion G2 passes through the passage, as illustrated in FIG. 6, the non-product portion G2 is curved in conformity with the shape of the curved portion 7a of the guide member 7 so that the front surface thereof exhibits a convex curved surface in the longitudinal direction. Thus, a tensile stress caused by the curving is applied around the microcracks C formed in the non-product portion G2.

As a result, the microcracks C are propagated by this tensile stress from the front surface side of the non-product portion G2 to the back surface side thereof, thereby being capable of breaking the non-product portion G2 into small pieces. Further, the pieces of the dross D adhere to the non-product portion G2 over the entire region in the longitudinal direction of the glass ribbon G, and hence the microcracks C are similarly formed over the entire region in the longitudinal direction. Thus, the non-product portion G2 only needs to pass through the passage, and thus the non-product portion G2 is broken continuously and automatically.

Moreover, with the manufacturing method for a glass sheet according to this embodiment, the product portion G1 of the glass ribbon G can be handled by roll-to-roll. Thus, when a plurality of glass sheet products are manufactured from the product portion G1 of the glass ribbon G, those glass sheet products can be processed collectively, thereby being capable of enhancing the manufacturing efficiency significantly.

In addition, this method adopts such a mode that, when the product portion G1 of the fused glass ribbon G is rolled as the second glass roll 6, the product portion G1 is rolled with the front surface thereof oriented inward. Thus, the following effect can also be provided.

That is, pieces of the molten glass M scattered at the time of fusing may adhere not only to the non-product portion G2 but also to the product portion G1 as pieces of the dross D. In this case, the microcracks C are also formed in the product portion G1 due to the thermal shock and the physical shock caused by the adhesion of the pieces of the dross D, with the result that the mechanical strength thereof is reduced. However, when the product portion G1 is rolled as the second glass roll 6 with the front surface thereof oriented inward, the front surface of the rolled product portion G1 is brought into a state in which a compression stress is applied thereto. Thus, it is possible to reduce the risk that the product portion G1 is damaged from the starting points being the microcracks C formed in the product portion G1.

Next, a second embodiment of the present invention is described. Note that, the second embodiment is described by taking as an example a case where a band-like glass ribbon formed by a down-draw method (overflow down-draw method) is fused into a product portion to be used as a product and selvage portions (non-product portions) to be discarded, and then the selvage portions after fusing are broken into small pieces so as to be discarded. Further, in the drawings for illustrating the second embodiment, components having the same function or shape as those in the above-mentioned manufacturing apparatus for a glass sheet according to the first embodiment are each denoted by the same reference symbol as that in the first embodiment to omit redundant description.

Figure 7:
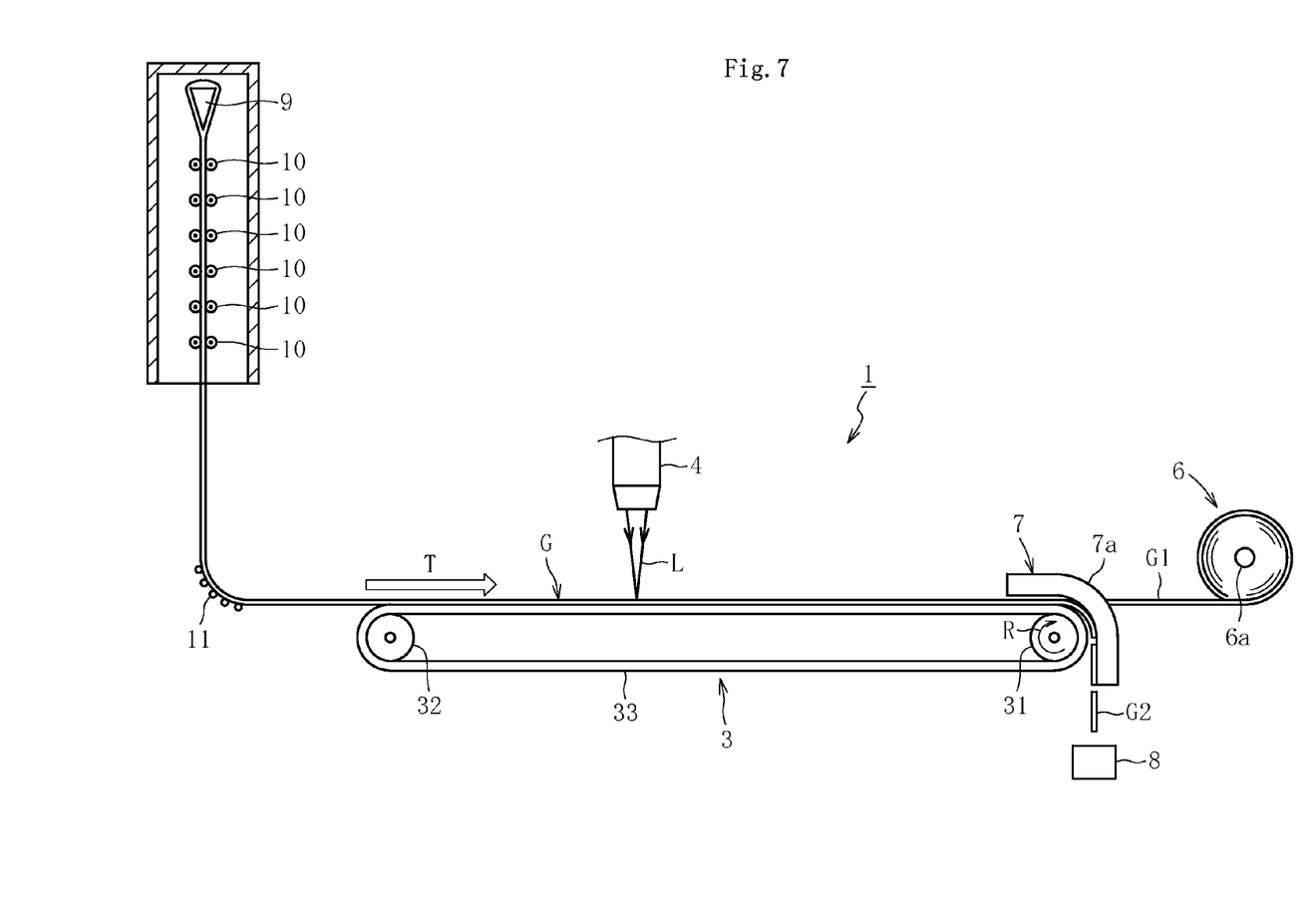
FIG. 7 is a side view illustrating a manufacturing apparatus for a glass sheet according to a second embodiment of the present invention.

FIG. 7 is a side view illustrating a manufacturing apparatus 1 for a glass sheet according to the second embodiment of the present invention. This manufacturing apparatus 1 for a glass sheet according to the second embodiment differs from the above-mentioned manufacturing apparatus for a glass sheet according to the first embodiment in that the manufacturing apparatus 1 for a glass sheet according to the second embodiment comprises, in place of the first glass roll, a forming trough 9 having a wedge-shaped cross section, for causing molten glass to overflow from the top portion thereof, a plurality of rollers 10 for guiding downward a glass ribbon G that starts to be formed when the flows of overflowed molten glass flow along both side surfaces of the forming trough 9 so as to join at a lower end thereof, and a plurality of auxiliary rollers 11 for changing the advancing direction of the glass ribbon G, which is drawn by the rollers 10 to fall vertically downward, to the horizontal direction. Note that, present cutting lines X extend in the longidirection of the glass ribbon G along the boundary between the product portion and each of the selvage portions (non-product portions).

According to a manufacturing method for a glass sheet using this manufacturing apparatus 1 for a glass sheet, the selvage portions can be continuously fused off the glass ribbon G formed by the down-draw method, and pieces of molten glass M scattered with the pressure of an assist gas A can be caused to adhere to the selvage portions as pieces of dross D. Thus, the mechanical strength of the selvage portions after fusing can be significantly reduced, thereby being capable of breaking the selvage portions into small pieces efficiently.

Note that, the above-mentioned manufacturing methods for a glass sheet according to the first and second embodiments can provide the effects more suitably as the glass ribbon G to be fused is thinner. That is, when the dross D is not caused to adhere to non-product portions G2, there occurs such a phenomenon that, when a stress to break the non-product portions G2 is applied thereto, the non-product portions G2 may be deformed and the applied stress may be weakened due to the small thickness. Consequently, in order to break the non-product portions G2, it is necessary to take measures to cause more significant deformation (curve) in the non-product portions G2, to thereby apply a more significant stress to the non-product portions G2. However, according to those manufacturing methods for a glass sheet, even when the thickness is small, the mechanical strength of the non-product portions G2 can be easily reduced by causing the dross D to adhere thereto. Thus, the non-product portions G2 can be broken without taking such measures as described above.

Herein, the structure of each of the manufacturing apparatus for a glass sheet according to the present invention is not limited to the structure described in each of the above-mentioned embodiments. For example, in a glass ribbon formed by a float method or another down-draw method (slot down-draw method), selvage portions formed at both ends thereof in the width direction may be fused and the selvage portions after fusing may be broken into small pieces so as to be discarded.

Further, in each of the above-mentioned embodiments, each of the non-product portions (selvage portions) is caused to pass through the passage formed by the belt of the belt conveyor and the guide member, to thereby break the non-product portions (selvage portions) into small pieces, but the present invention is not limited thereto. For example, a plurality of suction holes may be formed in the belt so as to suck the non-product portion with a negative pressure applied to the non-product portion, and a tensile stress may be applied around microcracks due to the curving deformation of the non-product portion, which is caused when the belt rolls around rollers, to thereby break the non-product portion into small pieces. Further, for example, each of the belt conveyors for conveying the non-product portion (selvage portion) may be segmented into two belt conveyors on the upstream side and the downstream side, and the conveyance speed of the non-product portion may be set higher at the belt conveyor on the downstream side than at the belt conveyor on the upstream side. In this case, a tensile stress can be applied to the non-product portion due to the difference in the conveyance speeds of the non-product portions between both the belt conveyors, thereby being capable of breaking the non-product portion into small pieces.

Figure 8:
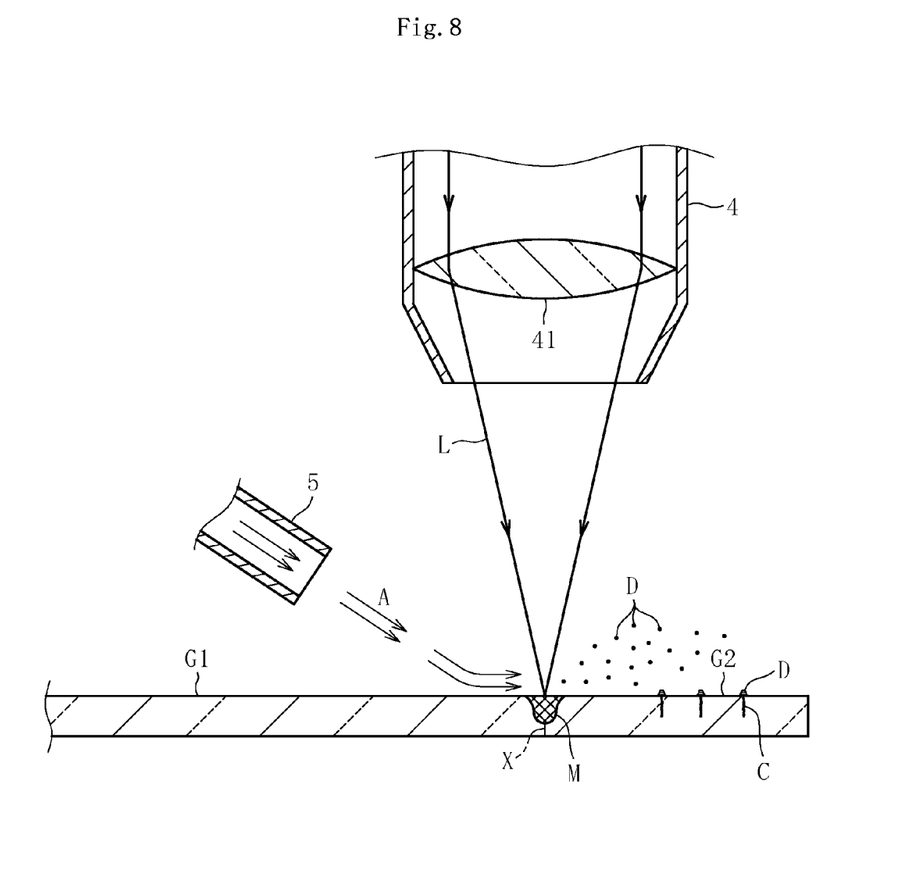
FIG. 8 is a side view illustrating a manufacturing apparatus for a glass sheet according to another embodiment of the present invention.

Moreover, glass to be fused is not limited to the glass ribbon, and may be, for example, a rectangular glass sheet. Further, unlike each of the above-mentioned embodiments, the jetting port of the assist gas jetting nozzle does not need to open toward the irradiation portion of the laser. For example, as illustrated in FIG. 8, an assist gas jetting nozzle 5 may be installed so that the jetting port thereof opens toward a position out of the irradiation portion of the laser L. The assist gas A jetted from the nozzle 5 may form a flow along the front surface of the glass to be fused, to pass through the irradiation portion of the laser L from the product portion G1 side to the non-product portion G2 side.

In addition, in each of the above-mentioned embodiments, the laser irradiator 4 and the guide member 7 (curved portion 7a) are arranged at a distance away from each other, but the distance therebetween may be set optionally. Further, in view of the risk that the product portion and each of the non-product portions after fusing may strike or slide against each other, it is preferred that the distance therebetween be shorter. Moreover, in order to prevent the product portion and each of the non-product portions from striking or sliding against each other, for example, the belt conveyor for conveying the product portion after fusing and the belt conveyor for conveying each of the non-product portions after fusing may have such structures as described below.

That is, the width of the belt conveyor for conveying each of the non-product portions may be adjusted so that a cutting end portion formed in each of the non-product portions by fusing is deflected by projecting from the belt conveyor toward the product portion side. With this, each of the non-product portions is conveyed under a state in which the deflected cutting end portion of each of the non-product portions is located at a relatively lower position in the thickness direction with respect to each of the cutting end portions of the product portion. Further, contrary to the above-mentioned structure, the width of the belt conveyor for conveying the product portion may be adjusted so that each of the cutting end portions formed in the product portion by fusing is deflected by projecting from the belt conveyor toward the non-product portion side. With this, the product portion is conveyed under a state in which each of the deflected cutting end portions of the product portion is located at a relatively lower position in the thickness direction with respect to the cutting end portion of each of the non-product portions. Moreover, the belt conveyor for conveying the product portion and the belt conveyor for conveying each of the non-product portions may be arranged at a distance away from each other in the thickness direction (both the belt conveyors may be separated from each other in the vertical direction). That is, a conveyance surface of the belt conveyor for conveying the product portion (surface on which the product portion is placed) and a conveyance surface of the belt conveyor for conveying each of the non-product portions (surface on which each of the non-product portions is placed) may be set different in height in the thickness direction.

With those structures, it is possible to suitably prevent each of the cutting end portions formed in the product portion and the cutting end portion formed in each of the non-product portions from striking or sliding against each other due to, for example, warping deformation caused during fusing or vibration caused during conveyance. Note that, the separation distance between both the cutting end portions along the thickness direction is preferably 1 mm or more, more preferably 3 mm or more.

REFERENCE SIGNS LIST 1 manufacturing apparatus for glass sheet
2 first glass roll 4 laser irradiator
5 assist gas jetting nozzle
7 guide member
7a curved portion
G glass ribbon
G1 product portion
G2 non-product portion
L laser
M molten glass
D dross
X preset cutting line
A assist gas

The invention claimed is:

1. A manufacturing method for a glass sheet, comprising:
fusing a glass sheet by irradiating the glass sheet with a laser along a preset cutting line, which is a boundary between a product portion to be used as a product and a non-product portion to be discarded, and jetting an assist gas onto molten glass generated by melting the glass sheet through heating with the laser so as to remove the molten glass by scattering the molten glass; and
breaking the non-product portion so as to discard the non-product portion, wherein
the glass sheet comprises a band-shaped glass ribbon,
the preset cutting line extends in parallel to a longitudinal direction of the band-shaped glass ribbon,
the assist gas is jetted from a product portion side with respect to the preset cutting line, to thereby cause scattered pieces of the molten glass to adhere to the non-product portion as pieces of dross, and
one of a front surface and a back surface of the non-product portion having the pieces of dross adhering thereto after the fusing, and onto which the laser is caused to enter, is curved so as to exhibit a convex curved surface in the longitudinal direction, so that a tensile strength is applied to the convex curved surface of the non-product portion, to thereby break the non-product portion into pieces.

2. The manufacturing method for a glass sheet according to claim 1, wherein the assist gas is jetted from one of a front surface side and a back surface side of the glass sheet, onto which the laser is caused to enter.

3. The manufacturing method for a glass sheet according to claim 2, wherein the product portion has a thickness of 500 μm or less.

4. The manufacturing method for a glass sheet according to claim 1, wherein the product portion has a thickness of 500 μm or less.

5. The manufacturing method for a glass sheet according to claim 1, further comprising forming the band-shaped glass ribbon by a down-draw method,
wherein the non-product portion comprises a selvage portion formed at each of both ends of the band-shaped glass ribbon in a width direction thereof.

6. The manufacturing method for a glass sheet according to claim 1, further comprising feeding the band-shaped glass ribbon from a glass roll formed by rolling the band-shaped glass ribbon.

7. The manufacturing method for a glass sheet according to claim 1, further comprising preparing a passage through which the non-product portion after the fusing is caused to pass, the passage having a curved portion, which is curved into a round shape.

8. The manufacturing method for a glass sheet according to claim 1, further comprising separating a cutting end portion formed in the product portion after the fusing and a cutting end portion formed in the non-product portion after the fusing away from each other along a thickness direction.

* * * * *